UNITED STATES PATENT OFFICE.

ERNEST HUMBERT, OF CHICAGO, ILLINOIS.

MAKING STEEL.

1,187,623.  Specification of Letters Patent.  Patented June 20, 1916.

No Drawing.  Application filed January 29, 1913.  Serial No. 744,811.

*To all whom it may concern:*

Be it known that I, ERNEST HUMBERT, a citizen of the Republic of France, residing in Chicago, Illinois, have invented certain new and useful Improvements in Making Steel, of which the following is a specification.

In a previous patent (No. 943,192 dated December 4th, 1909) I have described a method of making or refining steel especially applicable to the electric furnace working upon phosphoric metal. Briefly stated, this process consists in first employing a slag of lime and ore which extracts the phosphorus from the metal and converts it into phosphate of lime; second, and then adding carbon which by its reducing action fixes the phosphorus in the slag as phosphid. The advantage of this process is in permitting the entire refining process to be carried out with a single slag; while previously it was customary to pour off the phosphate slag as soon as the phosphorus had been taken up therein and to use a second slag for the finishing operations.

According to the present invention a one slag process is used with a saving of time and current and a saving of lime and other materials as compared with my previous process and with an improvement in the quality of the product. The slag is used in such a way as to overlap from one heat to the next. It forms the finishing slag of the one heat and the starting slag of the next heat. After it has performed its duty as a dephosphorizing slag it is poured on and a new slag introduced which finishes this heat and in turn starts the next heat. The finishing slag is introduced as a mixture of lime, silica and carbon and generally some fluor-spar. Calcium carbid will be formed therein under the high temperature and reducing conditions. With this slag the finishing operations, such as the usual additions of ferromanganese, ferrosilicon and the like, are performed. The metal is then poured out into the ladle and into molds, leaving all or part of the slag in the furnace where it settles on the hearth. Or the slag may be poured off and part of it returned to the hearth of the furnace. To this old slag in the furnace I add iron oxid in the form of scale or equivalent oxidizing material sufficient to oxidize the carbon left in the slag and the calcium carbid and to leave an excess of the oxid; thus converting the slag into an oxidizing slag. The heat of oxidation of the calcium carbid is so great that added to the residual heat in the furnace the resulting oxidizing slag is liquefied. Fluor-spar may be added to increase its liquidity. The slag now consists of lime, silica and iron oxid and in some cases fluor-spar. Upon this slag I pour the metal to be refined and the slag in rising through the metal is completely mixed with the same, which physical action expedites the dephosphorization of the metal. The dephosphorization commences immediately and is completed in a comparatively short time. The slag containing the phosphate is then removed and a new finishing slag provided as above described.

A specific example is as follows, the method being applied to the refining of Bessemer metal containing 0.10 per cent. of phosphorus: Commencing with about three hundred pounds of finishing slag left in the furnace from the previous heat, add about two hundred pounds of scale. Working with approximately the above conditions in a Heroult furnace of the arc type I have found that the slag is kept fluid by the heat of oxidation of the carbid, and I have secured a good boil when the Bessemer metal has been poured into the furnace. In ten minutes' time the analysis of the metal has shown a practically complete reduction of phosphorus. The slag is then poured off and a new finishing slag applied which may, for example, consist of about twenty to thirty-five (20% to 35%) per cent. silica, ten to fifteen (10% to 15%) per cent. coke dust and the remainder lime and fluor-spar.

This process effects a large saving in cost for two reasons: first, only one slag is used with a saving of lime and other materials; second, a molten slag is obtained in the beginning of each heat by using the heat of oxidation of the calcium carbid contained in the previous slag. This means not only a saving in the electric current, but also a saving of a substantial amount of time. Besides the savings in cost above recited, this process also secures an improved product. The dephosphorization is more complete than with the usual process. The slag can be poured off at a time when the slag is comparatively hotter and the metal comparatively cooler than in the usual previous processes (where the slag is added in solid condition to the molten metal) which are the most favorable conditions for the formation and stability of phosphate of lime.

What I claim is—

In the making or refining of steel in an electric furnace the method which consists in providing a finishing slag containing calcium carbid, using this slag on one heat, removing the metal and retaining at least a part of said slag in the furnace, adding an oxidizer in sufficient quantity to combine with the calcium carbid and by the heat of combination to assist in keeping the slag molten and to leave an excess of oxidizing material for dephosphorizing the next heat, adding the next heat and removing the slag after dephosphorization.

In witness whereof, I have hereunto signed my name in the presence of two subscribing witnesses.

ERNEST HUMBERT.

Witnesses:
D. ANTHONY USINA,
LULU STUBENVOLL.

Copies of this patent may be obtained for five cents each, by addressing the "Commissioner of Patents, Washington, D. C."